No. 682,475. Patented Sept. 10, 1901.
S. W. MAQUAY.
PRIMARY BATTERY.
(Application filed Aug. 6, 1900.)

(No Model.)

WITNESSES.
John Chalmers Wilson
Gustav R. Thompson

INVENTOR.
Samuel William Maquay
by Wilkinson & Fisher Attys

UNITED STATES PATENT OFFICE.

SAMUEL WILLIAM MAQUAY, OF CHERTSEY, ENGLAND.

PRIMARY BATTERY.

SPECIFICATION forming part of Letters Patent No. 682,475, dated September 10, 1901.

Application filed August 6, 1900. Serial No. 26,096. (No model.)

*To all whom it may concern:*

Be it known that I, SAMUEL WILLIAM MAQUAY, a subject of the Queen of Great Britain, residing at Chertsey, in the county of Surrey, England, have invented a certain new and useful Improvement in Primary Batteries, of which the following is a specification.

My invention relates to certain improvements in that class of primary batteries having electrodes or plates so arranged that the internal resistance of the same may be readily varied by increasing the relative distance between such plates or electrodes, one arrangement for effecting this consisting in making the zinc or metal plates of a tapered, conical, or like form, the carbon or second electrode presenting corresponding recesses, into which the zinc plates are dropped and in and out of which they may be moved, the object of the same being to obtain certain improvements in the construction of such batteries with a view to their better and more economical working.

In the accompanying drawings are illustrated my improvements in connection with primary batteries.

Figure 1:
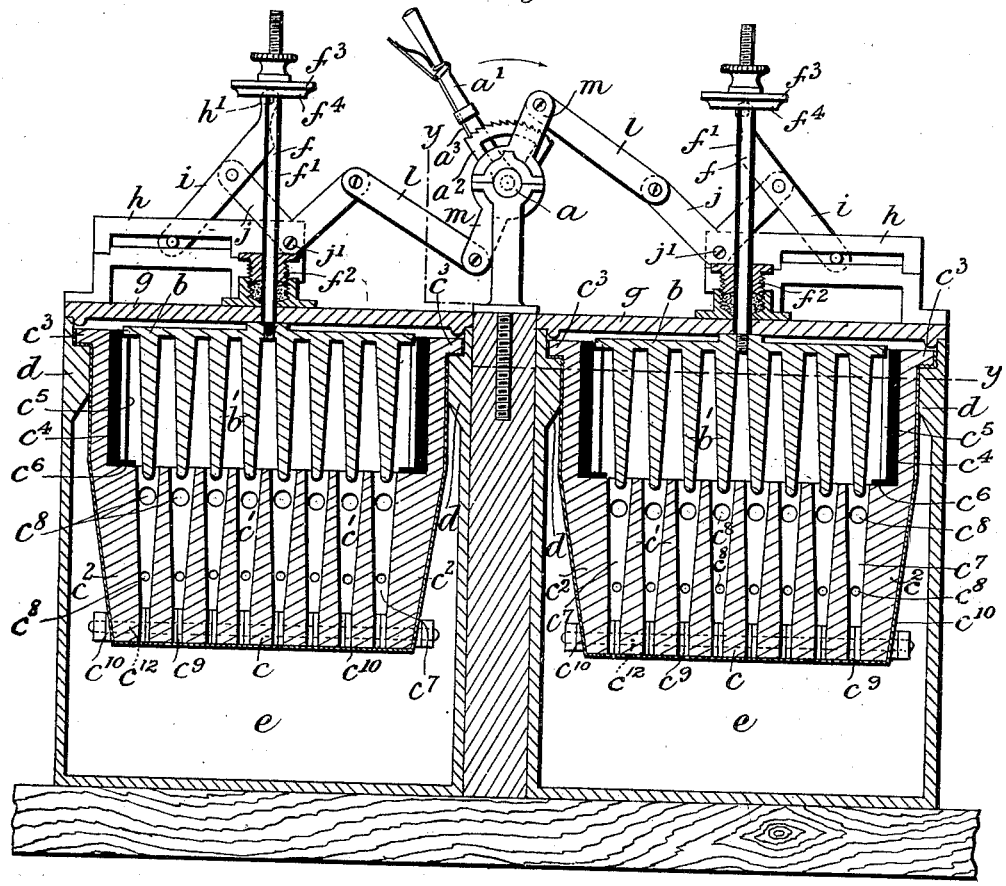
Figure 2:
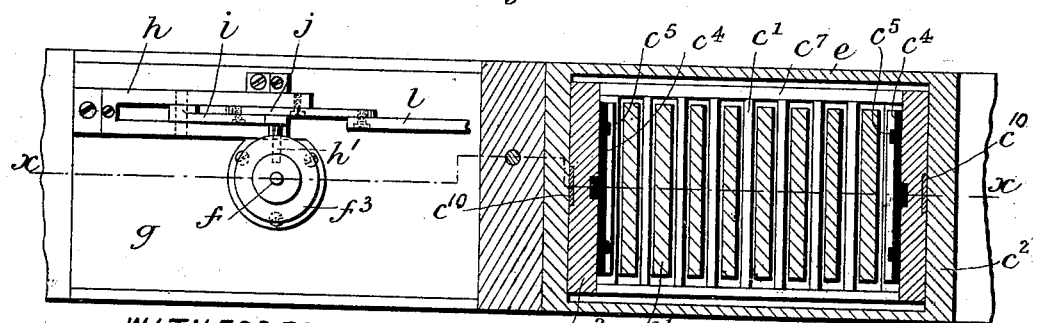

In the drawings, Figure 1 is a sectional elevation of two cells on line $x\,x$ of Fig. 2, and Fig. 2 is on the left-hand side a plan of Fig. 1 and on the right-hand side a section on line $y\,y$ of Fig. 1.

In the drawings two cells are shown arranged side by side, as that is a convenient way of operating them by means of a toggle device, and although two only are shown it will be understood that a large number may be arranged in this way side by side and operated by a central shaft $a$.

The top plate in the arrangement shown consists of a part $b$, of zinc, having a series of depending tapered rake-like teeth $b'$, while the bottom plate consists of a part $c$, consisting of a series of teeth $c'$, corresponding to the shape of the teeth $b'$. The part $c$ is closed at the front and back in the sense in which it is looked at on the drawings by walls $c^7$; but the plate $b$ is open, and the former is provided with side walls $c^2$, extended upwardly and provided with flanges $c^3$, adapted to rest on projections $d$ on the sides of the liquid-containing cell $e$. The upper part of the walls $c^2$ have linings $c^4$, of insulating material, which may be provided with vertical ribs $c^5$ to act as guides for the top plate $b$, which is correspondingly slotted. The lower part of the insulating material $c^4$ is provided with a distance-piece of like material $c^6$, on which the plate $b$ may rest when in its lowest position. The walls $c^7$ are perforated with openings $c^8$, and the bottom of the plates $c$ are provided with holes $c^9$, so that a free circulation of the liquid can take place. Such walls $c^7$ provide in connection with the teeth $c'$ a very large surface of carbon plate, which keeps the internal resistance of the battery very low.

The part $c$ is made up of teeth $c'$, which are separate from each other, the block $c$ so formed being bound together in some suitable way, as by bolts $c^{12}$, passing through all the sections, such bolts being provided with nuts to hold the sections in place. The bolts may be of ebonite, lead, or other suitable material not acted on by the acids. All the sections or teeth are also connected by a strip of platinum or conducting metal $c^{10}$ around the same, as shown. The upper electrode may also be formed in sections bolted together, as in the case of the lower one.

For the purpose of separating the plates, and thus increasing or diminishing the resistance, the upper plate is raised and lowered by means of a rod $f$, suitably insulated by a casing $f'$, said rod passing through a stuffing-box $f^2$ and having a head $f^3$, with a disk of insulating material $f^4$. The stuffing-box is carried by the lid $g$ of the cell $e$, and such lid also carries a frame $h$, acting as a guide for a toggle $i$, a pin $h'$ on the upper end of which supports the disk $f^4$ and head $f^3$ of the lifting-rod. The said cell and lid may be of any non-conducting substance not affected by acids. Connected about midway of the arm is a crank $j$, pivoted at $j'$ to the frame $h$, the other end of which is attached by a link $l$ to an arm $m$, secured to the shaft $a$. By the rocking of this shaft $a$ in one direction by the lever $a'$ it will be seen that the link $l$ will be pulled and will thus through crank $j$, arm $i$, head $f^3$, and lifting-rod $f$ raise the plates, which are shown in the drawings, in their highest position. By the arrangement of parts shown it will be seen that the same movement of the shaft will also exert a pull on the link $l$ on the other side, so that a corresponding movement takes place with the other plates. For holding the shaft $a$ in any desired position a ratchet $a^2$ and a pawl $a^3$, carried by the lever $a'$, are employed, so that the weight of the upper plates added to vibration will not tend to alter the position of the upper and lower plates with respect to each other in cases where the battery is used in some moving body, such as a vehicle.

What I claim is—

1. In an electric battery, the combination with a stationary electrode having a series of upwardly-extending teeth surrounded by side walls of the same material, of a receptacle in which said electrode is held, a movable electrode comprising a plate having a series of downwardly-extending teeth adapted to occupy the spaces between the teeth of the stationary electrode, and means for raising and lowering said movable electrode, substantially as described.

2. In an electric battery, the combination with a stationary electrode having a series of upwardly-projecting teeth surrounded by side walls perforated at intervals between said teeth, said teeth being bolted together near their lower extremities leaving openings upward between adjacent teeth, of a conducting-strip secured to the said teeth and to the side of said walls, a receptacle and means for supporting said electrode by its side walls from the upper portion of said receptacle, a movable electrode comprising a plate having a series of downwardly-extending teeth adapted to occupy the spaces between the teeth of the stationary electrode, and means for raising and lowering said movable electrode, substantially as described.

In testimony whereof I have hereunto set my hand in the presence of two subscribing witnesses.

SAMUEL WILLIAM MAQUAY.

Witnesses:
 EDWIN LONG,
 ALLEN PARRY JONES.